United States Patent
Hashimoto et al.

(10) Patent No.: US 10,763,730 B2
(45) Date of Patent: Sep. 1, 2020

(54) INSULATING RESIN COATING METHOD AND STATOR

(71) Applicant: AISIN AW CO., LTD., Anjo-shi, Aichi-ken (JP)

(72) Inventors: Shingo Hashimoto, Okazaki (JP); Shingo Sato, Okazaki (JP); Kento Takase, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 290 days.

(21) Appl. No.: 15/735,807

(22) PCT Filed: Jul. 29, 2016

(86) PCT No.: PCT/JP2016/072403
§ 371 (c)(1),
(2) Date: Dec. 12, 2017

(87) PCT Pub. No.: WO2017/026306
PCT Pub. Date: Feb. 16, 2017

(65) Prior Publication Data
US 2019/0097506 A1    Mar. 28, 2019

(30) Foreign Application Priority Data

Aug. 10, 2015   (JP) .................. 2015-158458

(51) Int. Cl.
*H02K 11/00*   (2016.01)
*H02K 15/12*   (2006.01)
(Continued)

(52) U.S. Cl.
CPC ....... *H02K 15/12* (2013.01); *B29C 45/14336* (2013.01); *H02K 1/16* (2013.01);
(Continued)

(58) Field of Classification Search
CPC ........... H02K 15/12; H02K 1/16; H02K 3/38; H02K 3/50; H02K 15/0081; H02K 15/024;
(Continued)

(56) References Cited

U.S. PATENT DOCUMENTS 4,151,434 A    4/1979  Zona et al.
6,147,432 A *  11/2000 Kusase .................... H02K 3/50
                                                    310/179
(Continued)

FOREIGN PATENT DOCUMENTS

FR    1489751 A       7/1967
JP    S57-32588 B2    7/1982
(Continued)

OTHER PUBLICATIONS

Nov. 1, 2016 Search Report issued in International Patent Application No. PCT/JP2016/072403.

*Primary Examiner* — Thanh Lam
(74) *Attorney, Agent, or Firm* — Oliff PLC (57) ABSTRACT

An insulating resin coating method for coating with an insulating resin a weld of a stator having a plurality of the welds formed by welding ends of coil wires together, the method including the steps of: sandwiching and covering the weld of the coil wires by a pair of resin-molding molds; and injecting the resin into the resin-molding molds by a resin injector.

14 Claims, 9 Drawing Sheets

(51) Int. Cl.
  *H02K 15/10* (2006.01)
  *B29C 45/14* (2006.01)
  *H02K 1/16* (2006.01)
  *H02K 3/38* (2006.01)
  *H02K 3/50* (2006.01)
  *H02K 15/00* (2006.01)
  *H02K 15/02* (2006.01)
  *B29K 81/00* (2006.01)
  *B29K 105/00* (2006.01)
  *B29K 705/10* (2006.01)
  *B29L 31/00* (2006.01)

(52) U.S. Cl.
  CPC ............... *H02K 3/38* (2013.01); *H02K 3/50* (2013.01); *H02K 15/0081* (2013.01); *H02K 15/024* (2013.01); *H02K 15/10* (2013.01); *H02K 15/105* (2013.01); *B29K 2081/04* (2013.01); *B29K 2105/0079* (2013.01); *B29K 2705/10* (2013.01); *B29L 2031/748* (2013.01); *H02K 2203/06* (2013.01)

(58) Field of Classification Search
  CPC .. H02K 15/10; H02K 15/105; H02K 2203/06; B29C 45/14336; B29K 2081/04; B29K 2105/0079; B29K 2705/10; B29K 2031/748; B29K 2203/06
  USPC ......... 310/43, 71, 310; 29/596, 598, 605, 29
  See application file for complete search history.

(56) References Cited

U.S. PATENT DOCUMENTS

| | | | |
|---|---|---|---|
| 6,462,453 | B1 | 10/2002 | Asao et al. |
| 9,653,974 | B2 * | 5/2017 | Masubuchi ............ H02K 15/03 |
| 2002/0024266 | A1 * | 2/2002 | Asao ..................... H02K 3/12 310/201 |
| 2002/0033649 | A1 * | 3/2002 | Oohashi ................. H02K 3/28 310/184 |
| 2011/0175472 | A1 | 7/2011 | Koike et al. |
| 2011/0198953 | A1 * | 8/2011 | Shinohara ............. H02K 3/12 310/71 |
| 2013/0049515 | A1 | 2/2013 | Hisada et al. |
| 2019/0097484 | A1 * | 3/2019 | Kaneshige ............. H02K 3/48 |

FOREIGN PATENT DOCUMENTS

| | | |
|---|---|---|
| JP | 2000-164043 A | 6/2000 |
| JP | 2001-238419 A | 8/2001 |
| JP | 2011-151955 A | 8/2011 |
| JP | 2011-223685 A | 11/2011 |
| JP | 2012-070515 A | 4/2012 |

* cited by examiner

(SECOND EMBODIMENT) FIG. 10

(THIRD EMBODIMENT) FIG. 11

FIG. 12

(FOURTH EMBODIMENT)

FIG. 13

(FIRST MODIFICATION)

FIG. 14

(SECOND MODIFICATION)

FIG. 15

(THIRD MODIFICATION)

INSULATING RESIN COATING METHOD AND STATOR

BACKGROUND

The present disclosure relates to insulating resin coating methods and stators.

Stator having welded portions at the ends of coil wires being coated with an insulating resin are conventionally known in the art. For example, Japanese Patent Application Publication No. 2012-070515 (JP 2012-070515 A) describes such a stator.

The stator described in JP 2012-070515 A includes an annular mold portion formed by performing resin molding on entire coil end portions. The coil end portions have welded portions formed by welding the ends of coil wires together. In JP 2012-070515 A, the entire coil end portions are coated with the mold portion, whereby the welded portions are insulation-coated.

The configuration in which resin molding is performed on the entire coil end portions as in JP 2012-070515 A is disadvantageous in that a larger amount of material is required for insulation coating and in that coil cooling efficiency is low because the entire coil end portions are covered with resin.

Japanese Patent Application Publication No. 2011-223685 (JP 2011-223685 A) describes another configuration for coating welded portions with an insulating resin. A stator described in JP 2011-223685 A has coils formed by welding the ends of a plurality of conductor segments that are formed by rectangular wires. The stator has many welded portions formed by welding the ends of the conductor segments. Each welded portion is insulation-coated by attaching a cap-shaped insulating resin to each welded portion.

Unlike the stator of JP 2012-070515 A in which the portions other than the welded portions are also coated with the insulating resin, only the welded portions can be insulation-coated in the stator described in JP 2011-223685 A. The required amount of material can therefore be reduced in the stator of JP 2011-223685 A.

SUMMARY

In JP 2011-223685 A, however, the individual welded portions formed by welding do not have the same shape (the welded portions do not have the same shape due to variation among coils etc.). It is therefore necessary to use insulating resin caps having a larger size than the welded portions. Namely, it is necessary to fix the insulating resin caps to the welded portions by an adhesive etc. The step of applying the adhesive is therefore required to insulation-coat the welded portions, which reduces productivity.

An exemplary aspect of the disclosure provides an insulating resin coating method and a stator in which an insulating resin can be formed only on portions necessary to insulate welded portions without reducing productivity.

An insulating resin coating method according to a first aspect of the present disclosure is an insulating resin coating method for coating with an insulating resin a weld of a stator having a plurality of the welds formed by welding ends of coil wires together. The insulating resin coating method includes the steps of: sandwiching and covering the weld of the coil wires by a pair of resin-molding molds; and injecting the resin into the resin-molding molds by a resin injector.

As described above, the insulating resin coating method according to the first aspect of the present disclosure includes: the steps of: sandwiching and covering the weld of the coil wires by the pair of resin-molding molds; and injecting the resin into the resin-molding molds by the resin injector. Each weld can thus be insulation-coated by forming the insulating resin only on a portion necessary to insulation-coat the weld by resin molding using the resin-molding molds. The weld can be coated by merely closing the resin-molding molds with the weld sandwiched therebetween and injecting the resin into the resin-molding molds. Accordingly, unlike the case where a cap-shaped insulating resin is attached to each weld, the plurality of welds can be insulation-coated without requiring the step of applying an adhesive. Productivity is therefore not reduced. As described above, according to the present disclosure, the insulating resin can be formed only on portions necessary to insulate the welds without reducing productivity.

A stator according to a second aspect of the present disclosure includes: a stator core having a plurality of slots; a plurality of coils formed by coil wires that are inserted into the plurality of slots; a plurality of welds formed by welding ends of the coil wires; and a plurality of insulating coaters formed by resin molding on the welds of the coil wires and coating the plurality of welds.

As described above, the stator according to the second aspect of the present disclosure includes the plurality of insulating coaters formed by resin molding on the welds of the coil wires and coating the plurality of welds. Each weld can thus be insulation-coated by forming an insulating resin only on a portion necessary to insulation-coat the weld by resin molding using resin-molding molds. When forming the insulating coater, the weld can be coated by merely closing the resin-molding molds with the weld sandwiched therebetween and injecting the resin into the resin-molding molds. Accordingly, unlike the case where a cap-shaped insulating resin is attached to each weld, the plurality of welds can be insulation-coated without requiring the step of applying an adhesive. Productivity is therefore not reduced. As described above, according to the present disclosure, the stator in which the insulating resin is formed only on portions necessary to insulate the welds can be obtained without reducing productivity.

According to the present disclosure, as described above, an insulating resin can be formed only on portions necessary to insulate welds without reducing productivity.

DETAILED DESCRIPTION OF EMBODIMENTS

Embodiments of the present disclosure will be described below based on the accompanying drawings.

First Embodiment

The structure of a stator 100 according to a first embodiment will be described with reference to FIGS. 1 to 6.

(Overall Configuration of Stator)

Figure 1:
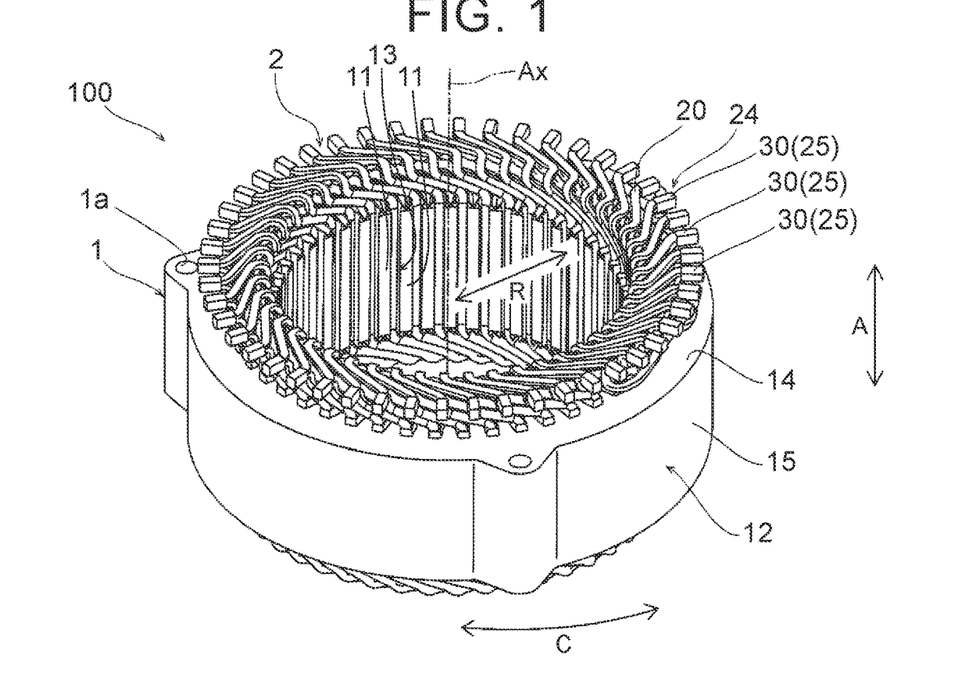
FIG. 1 is a perspective view of a stator according to a first embodiment.

As shown in FIG. 1, the stator 100 includes an annular stator core 1 and a plurality of coils 2 arranged in an annular shape along the inner periphery of the stator core 1. The stator 100 together with a rotor (not shown) is accommodated in a casing (not shown). For example, the stator 100 is mounted on vehicles such as an automobile.

For example, the stator core 1 is formed in an annular shape by stacking electrical steel sheets, and includes a plurality of teeth 11 that form slots 13, and a back yoke 12. The stator core 1 has a plurality of slots 13. The stator core 1 includes axial end faces 14 and a radial outer peripheral surface 15.

The plurality of teeth 11 extend in a radial pattern radially inward (toward a central axis Ax) from the back yoke 12. The teeth 11 are located at regular intervals in the circumferential direction of the stator core 1. Each slot 13 holding the coils 2 is formed between adjacent two of the teeth 11. The plurality of slots 13 are formed in the inner periphery of the stator core 1 along the circumference of the stator core 1 and extend in the radial direction. The back yoke 12 is a portion between the outer peripheral surface 15 of the stator core 1 and the radially outer ends of the slots 13 (the ends on the root side of the teeth 11) and extends along the circumference of the stator core 1. The axial end faces 14 are flat surfaces.

Figure 4:
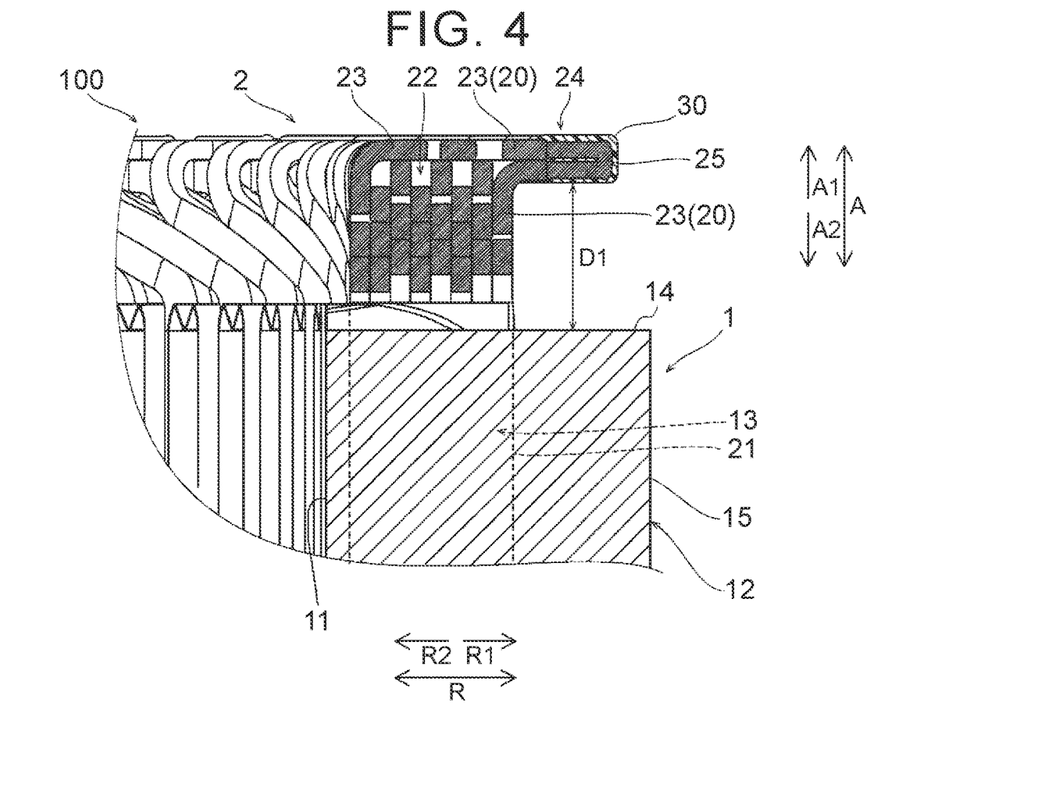
FIG. 4 is an enlarged section showing a welded portion and an insulating coating portion of the stator.

Hereinafter, the axial direction of the stator core 1 (the direction in which the central axis Ax extends) is referred to as the A direction. Of the A direction, the A1 direction away from the stator core 1 shown in FIG. 4 is referred to as toward the outside in the axial direction, and the A2 direction toward the stator core 1 is referred to as toward the inside in the axial direction. The radial direction (the direction of the radius) of the stator core 1 is referred to as the R direction. Of the R direction, the R1 direction shown in FIG. 4 is referred to as toward the outside in the radial direction, and the R2 direction is referred to as toward the inside in the radial direction. The circumferential direction of the stator core 1 is referred to as the C direction.

Figure 2A:
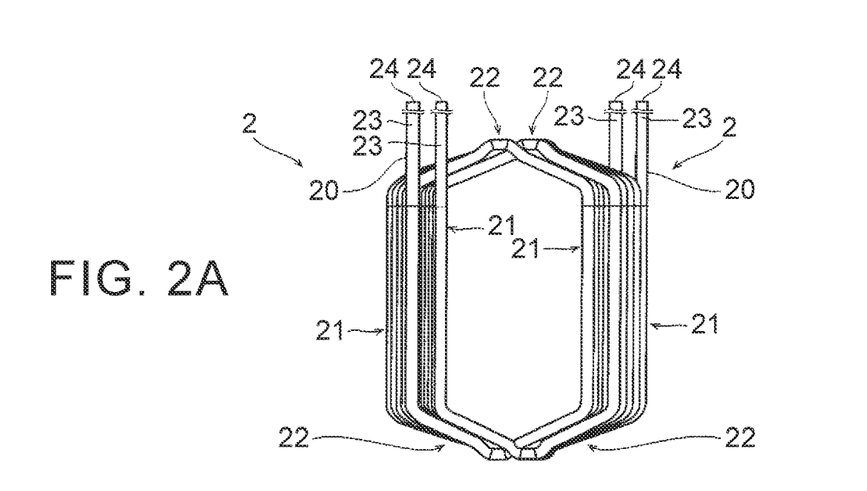
FIG. 2A is a front view of coils that are placed in a stator.
Figure 2B:
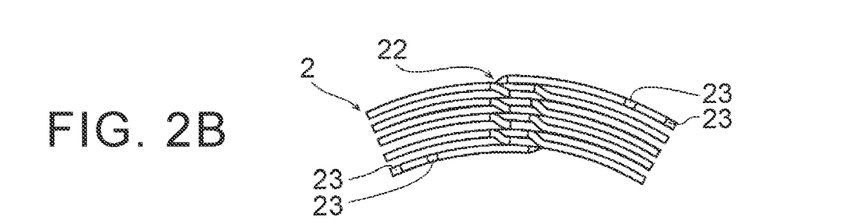
FIG. 2B is a plan view thereof.

As shown in FIG. 2, each coil 2 is formed by a coil wire 20 that is inserted into a plurality of slots 13. The coil wire 20 is a rectangular wire having a rectangular section. Each coil 2 is formed in a loop shape (shape of concentric winding) by winding a coil wire 20 a plurality of times (e.g., five times) and forming the resultant winding into a predetermined shape. The coil wire 20 is made of a highly conductive metal such as copper. The coil wire 20 has an insulation-coated surface.

Each coil 2 has a pair of slot accommodated portions 21 that are accommodated in the slots 13, a pair of coil end portions 22 that are placed outside the axial end faces 14 of the stator core 1, and lead wire portions 23 extending so as to project beyond the slots 13.

The pair of slot accommodated portions 21 are formed substantially linearly and are placed in separate slots 13 so as to extend in the axial direction. An insulating sheet (not shown) is placed along the inner wall surface of each slot 13 so that the stator core 1 is insulated from the coil 2 (slot accommodated portions 21) by the insulating sheet. The coil end portions 22 are bent to form a substantially triangular shape. The coil end portions 22 are placed so as to project axially outward beyond the axial end faces 14 on both sides of the stator core 1. The pair of coil end portions 22 connect the ends of the slot accommodated portions 21 that are separated from each other in the circumferential direction. The lead wire portions 23 are one end (winding start) and the other end (winding end) of the coil wire 20 wound a plurality of times.

As shown in FIG. 1, the stator 100 includes a plurality of welded portions 25 (i.e., welds) formed by welding ends 24 of the coil wires 20 together. The end 24 of each lead wire portion 23 is connected to another coil 2 or a connection terminal by welding. Each welded portion 25 is formed by welding the end 24 of one coil 2 to the end 24 of another coil 2. In the first embodiment, the stator 100 includes insulating coating portions 30 (i.e., insulating coaters) that coat the plurality of welded portions 25.

The lead wire portions 23 extend radially outward (in the R1 direction) in a radial pattern. Each lead wire portion 23 is placed at the same radial position as, or radially inside, the outer peripheral surface 15 of the stator core 1, as viewed in the axial direction (see FIG. 2). The "same radial position as, or radially inside, the outer peripheral surface 15" means the same radial position as the outer peripheral surface 15 or a radial position located inside the outer peripheral surface 15. More specifically, the lead wire portions 23 are placed so that the insulating coating portions 30 coating the welded portions 25 of the ends 24 are located at the same radial position as, or radially inside, the outer peripheral surface 15 of the stator core 1. The welded portions 25 extend in the radial direction of the stator core 1. Specifically, the welded portions 25 extend toward the outside in the radial direction of the stator core 1 (in the R1 direction).

A plurality of coils 2 are placed in each slot 13 of the stator core 1 in the circumferential direction (C direction). The plurality of coils 2 are arranged along the circumference of the stator core 1 so as to form an annular shape along the inner periphery of the stator core 1.

For example, the coils 2 are mounted, as concentric windings, in the stator core 1 so as to implement (A) to (C) described below.

(A) The plurality of coils 2 are placed in the slots 13 so as to be displaced by one slot from each other in the circumferential direction. (B) Two coils 2 that are adjacent to each other in the circumferential direction are mounted so that the coil wires 20 of the two coils 2 are alternately arranged in the direction in which the coils 2 are stacked (the radial direction). (C) Two coils 2 of the same phase which are disposed at a predetermined distance from each other in the circumferential direction are mounted so that the coil wires 20 of the slot accommodated portions 21 of the two coils 2 are alternately arranged in the same slot 13 in the direction in which the coils 2 are stacked (the radial direction).

For example, in the case where the stator 100 is a three-phase alternating current (AC) motor, the coils 2 of the same phase mean U-phase coils, V-phase coils, or W-phase coils. In this case, the coils 2 are arranged in a repeated pattern of two U-phase coils, two V-phase coils, and two W-phase coils in the circumferential direction C.

Figure 3:
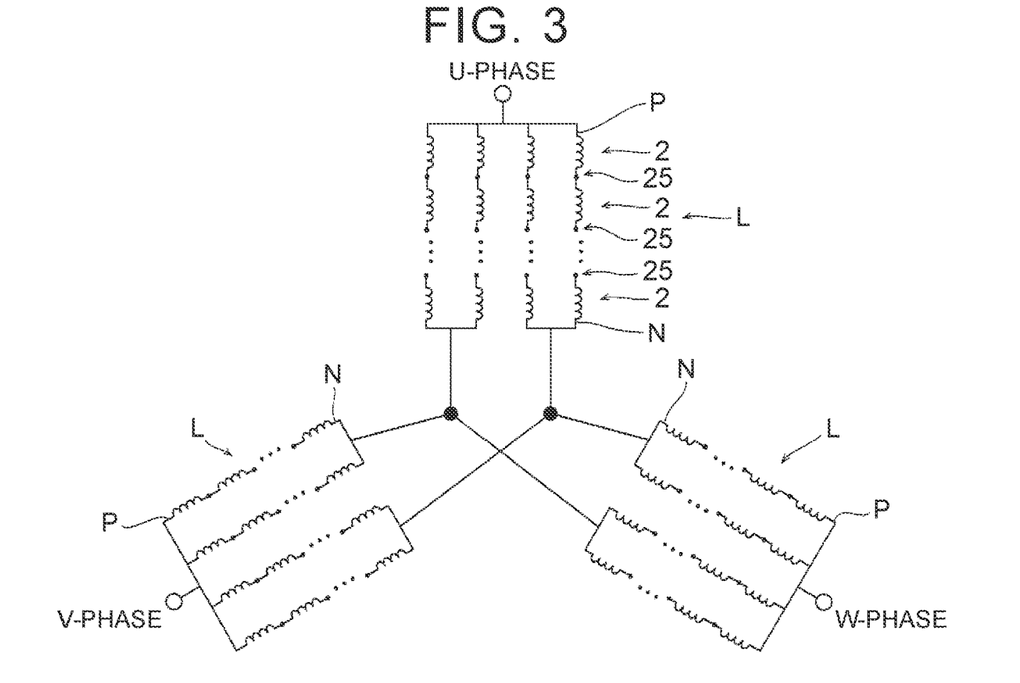
FIG. 3 is a diagram showing an example of a method for connecting coils.

For example, the coils 2 of each phase are connected in a Y configuration (star configuration) shown in FIG. 3. FIG. 3 shows a configuration of four parallel coil rows per phase. For example, for U-phase, four rows of a plurality of (e.g., eight) coils 2 connected in series (coil rows L) are connected in parallel. In each coil row L, the ends 24 of the lead wire portions 23 of the eight coils 2 connected in series are welded together to form seven welded portions 25.

The lead wire portion 23 at one end of each coil row L serves as a power line P and is connected to an external circuit. The lead wire portion 23 at the other end of each coil row L serves as a neutral line N and is connected to a neutral point.

(Structure of Welded Portion and Insulating Coating Portion)

The structure of the welded portion 25 and the insulating coating portion 30 will be described.

Figure 5:
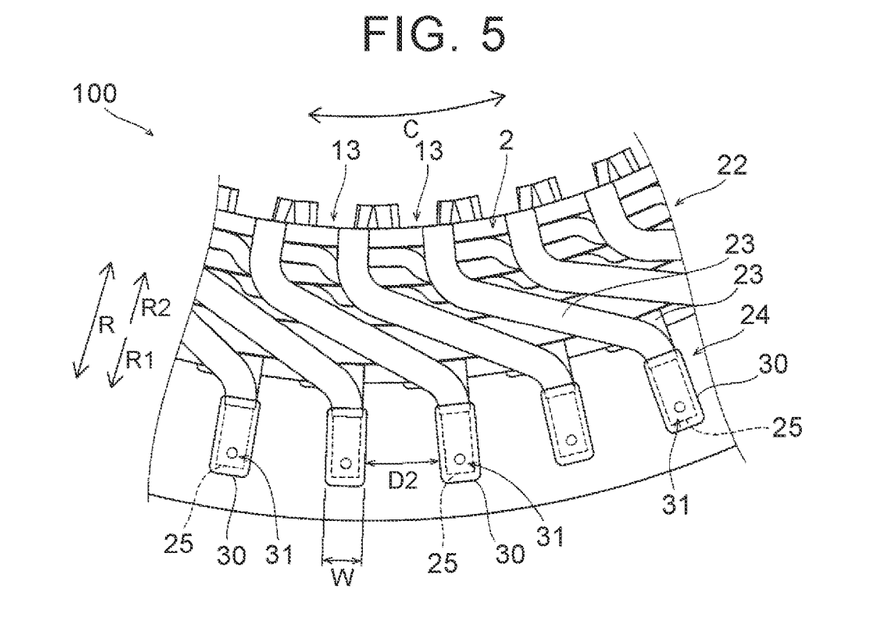
FIG. 5 is a plan view showing welded portions and insulating coating portions of the stator.

In the first embodiment, the ends 24 of the lead wire portions 23 (coil wires 20) which are welded together are arranged in a radial pattern toward the outside in the radial direction and are placed on top of each other in the axial direction. Specifically, as shown in FIGS. 4 and 5, one lead wire portion 23 is extended from the inside in the radial direction toward the outside in the radial direction (in the R1 direction) across the coil end portions 22. The other lead wire portion 23 stands in the axial direction (the A1 direction) from the slot 13 at an outer position in the radial direction and is bent radially outward. The ends 24 thus placed on top of each other are welded together to form the welded portion 25. The welded portion 25 is located at a position away from the axial end face 14 toward the outside in the axial direction (in the A1 direction).

The insulating coating portion 30 is formed by resin molding so as to cover the welded portion 25 of the coil wires 20 (lead wire portions 23). The insulating coating portion 30 is not formed in the coil end portions 22. As shown in FIG. 4, the insulating coating portion 30 (welded portion 25) is located at a position away from the axial end face 14 by a distance D1 toward the outside in the axial direction. The distance D1 is approximately equal to the amount by which the coil end portions 22 project.

As shown in FIG. 5, the insulating coating portion 30 is formed on each of the plurality of welded portions 25 located at intervals in the circumferential direction (the C direction). In the first embodiment, the welded portions 25 are arranged in the circumferential direction of the stator 100 along the entire circumference, and the plurality of insulating coating portions 30 are formed on all of the welded portions 25. The plurality of insulating coating portions 30 are located at intervals in the circumferential direction of the stator core 1. That is, the insulating coating portions 30 are arranged so as not to contact each other. In the first embodiment, a circumferential interval D2 between adjacent ones of the insulating coating portions 30 is larger than the circumferential width W of the insulating coating portion 30.

Figure 6:
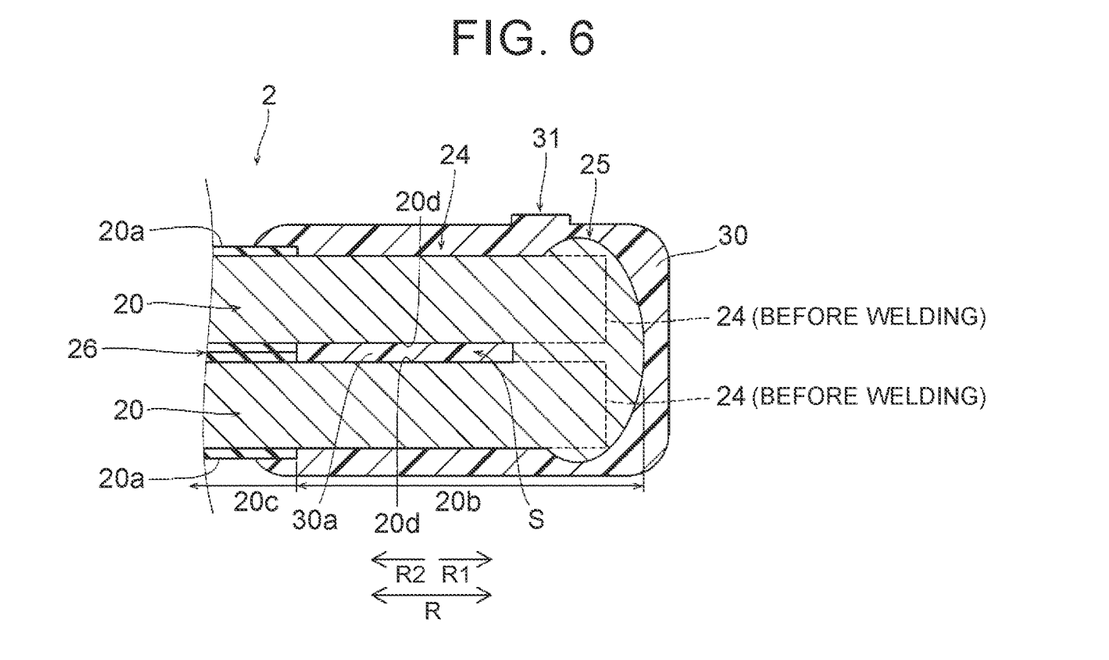
FIG. 6 is a schematic enlarged section illustrating a welded portion and an insulating coating portion.

As shown in FIG. 6, each lead wire portion 23 (coil wire 20) has an end 24 from which an insulating coating 20a has been removed, so that a conductor wire in the lead wire portion 23 is exposed at the end 24, and the welded portion 25 is formed on the exposed part. That is, each lead wire portion 23 (coil wire 20) includes an uncoated part 20b from which the insulating coating 20a has been removed, and a coated part 20c covered with the insulating coating 20a. The uncoated part 20b is formed by removing the insulating coating 20a of the end 24. The welded portion 25 is formed on the uncoated parts 20b.

The insulating coating portion 30 is formed by resin molding so as to cover the entire exposed parts of the conductor wires (the entire uncoated parts 20b) including the welded portion 25 and a part of the coated parts 20c (parts having the insulating coating 20a formed thereon) adjoining the uncoated parts 20b. In other words, the insulating coating portion 30 is formed on the ends 24 of the lead wire portions 23 (coil wires 20) so as to surround and cover the outer peripheral surfaces of the welded portion 25, the uncoated parts 20b, and a part of the coated parts 20c. As shown in FIG. 4, the insulating coating portion 30 is formed so as to cover the range of a predetermined distance from the ends 24 (welded portion 25) of the lead wire portions 23 (coil wires 20) to the coil end portions 22. The insulating coating portion 30 is formed so as to cover a part of the ends 24 of the lead wire portions 23 (coil wires 20) which project beyond the coil end portions 22.

The welded portion 25 formed on the ends 24 of the lead wire portions 23 does not have a linear rectangular section but has a roughly spherical shape due to expansion and melting during melting (the shape of the welded portion 25 is shown simplified in FIG. 5). An insulating resin that forms the insulating coating portion 30 is formed so as to surround the welded portion 25 by resin molding. The insulating resin around the welded portion 25 thus engages with the welded portion 25, thereby functioning as a retainer for the insulating coating portion 30. The resin thickness (coating thickness) of the insulating coating portion 30 is, e.g., about 0.5 mm.

The insulating coating portion 30 is formed so as to cover the welded portion 25 and to fill at least a part of the space between facing surfaces 20d of the ends 24 of the pair of coil wires 20 connected by the welded portion 25. As shown in FIG. 6, when placing the pair of coil wires 20 next to each other to weld their ends 24 together, clearance S is created between the facing surfaces 20d of the uncoated parts 20b because the uncoated parts 20b are thinner by an amount corresponding to the removed insulating coating 20a. Since the insulating coating portion 30 is also formed in the clearance S by resin molding, the insulating coating portion 30 includes an inner coating portion 30a that fills at least a part of the space between the facing surfaces 20d. FIG. 6 shows an example in which the clearance S is filled with the resin and the resin covers the entire facing surfaces 20d. However, the insulating coating portion 30 (inner coating portion 30a) may cover only a part of the facing surfaces 20d.

A resin material that is used for the insulating coating portion 30 is preferably a resin material having insulation properties and such heat resistance that the insulating coating portion 30 withstand an increase in temperature of the coil wires 20 which occurs when a current is applied to the stator 100. Examples of the resin material that is used for the insulating coating portion 30 include polyphenylenesulfide (PPS) and liquid crystal polymer (LCP). The insulating coating portion 30 has an injection mark 31 caused by resin molding at a position corresponding to an injection passage (gate) of a resin-molding mold 51 described below (see FIG. 7). Although the first embodiment shows an example in which the outer shape of the insulating coating portion 30 is a prism corresponding to the pair of coil wires 20 formed by rectangular wires, the outer shape of the insulating coating portion 30 may be other than a prism.

(Insulating Resin Coating Method)

A method for coating the welded portions 25 of the stator 100 with an insulating resin will be described with reference to FIGS. 7 to 9.

Figure 7:
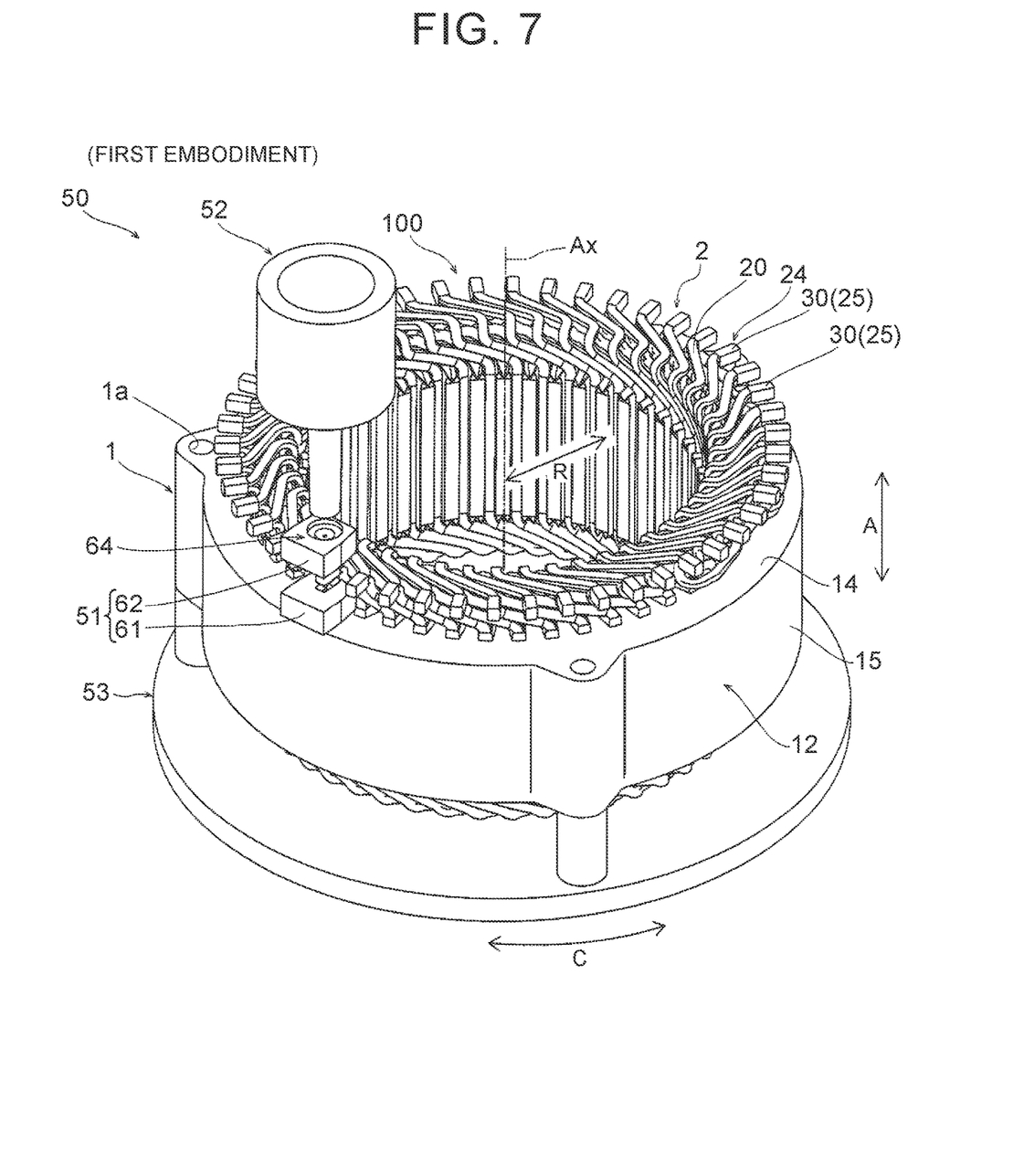
FIG. 7 is a perspective view illustrating an insulating resin coating method according to the first embodiment.

The insulating resin coating method according to the first embodiment is performed with a coating device 50 shown in FIG. 7. The coating device 50 includes a resin-molding mold 51, a resin injection portion 52 (i.e., resin injector), and a support portion 53.

The resin-molding mold 51 is formed by a pair of a first mold (lower mold) 61 and a second mold (upper mold) 62. As shown in FIG. 8, the first mold 61 and the second mold 62 are placed so as to face each other in the axial direction (A direction). The first mold 61 is placed on the inner side in the axial direction (the stator core 1 side), and the second mold 62 is placed on the outer side in the axial direction (the A1 direction side). The first mold 61 and the second mold 62 have, in their facing surfaces (inner surfaces), a cavity (molding recess) 63 corresponding to the shape of the insulating coating portion 30. The second mold 62 has a positioning recess 64 and an injection passage 65 that allows the positioning recess 64 to communicate with the cavity 63. The pair of resin-molding molds 51 (the first mold 61 and the second mold 62) can sandwich and cover a single welded portion 25. The first mold 61 and the second mold 62 can independently move in the axial direction to perform a mold closing operation and a mold opening operation.

The resin injection portion 52 is placed axially outside (on the A1 direction side of) the second mold 62 and can move in the axial direction. The resin injection portion 52 ejects molten resin from an injection port 52a formed at its tip end. With the injection port 52a connected to the positioning recess 64 of the second mold 62, the resin injection portion 52 ejects the molten resin from the injection port 52a, thereby injecting the molten resin into the cavity 63 through the injection passage 65. Since the insulating coating portion 30 is thin (e.g., about 0.5 mm), only a small amount of resin need be injected. The molten resin cures quickly because the amount of resin injected is small and the coil wires 20 placed in the cavity 63 are made of a metal material with high thermal conductivity such as copper.

The resin-molding mold 51 and the resin injection portion 52 can be moved toward and away from the stator 100 in the radial direction (R direction) by a moving mechanism, not shown.

As shown in FIG. 7, the support portion 53 is a support base that engages with attachment holes 1a of the stator core 1 and holds the stator core 1. The support portion 53 can be operated by a drive mechanism, not shown, to rotate the stator core 1 about the central axis Ax in the circumferential direction (C direction).

Each step of the insulating resin coating method according to the first embodiment is performed by the above configuration. The insulating resin coating method according to the first embodiment roughly includes the steps of sandwiching and covering the welded portion 25 of the coil wires 20 by the pair of resin-molding molds 51 (the first mold 61 and the second mold 62) and injecting resin into the resin-molding mold 51 by the resin injection portion 52. Each of the steps will be described in detail below.

<Step of Covering the Welded Portion by the Resin-Molding Mold>

As shown in FIG. 7, in the step of sandwiching and covering the welded portion 25 of the coil wires 20 by the pair of resin-molding molds 51 (the first mold 61 and the second mold 62), the resin-molding mold 51 and the resin injection portion 52 are moved radially inward (in the R2 direction) from a radially outer position with respect to the stator 100 having been subjected to a welding process (having the welded portions 25 formed therein) and having been placed on the support portion 53. The resin-molding mold 51 and the resin injection portion 52 thus get closer to the stator 100. At this time, the first mold 61 and the second mold 62 are located away from each other in the axial direction with the first mold 61 being placed axially inside (on the stator core 1 side of) the welded portion 25 and the second mold 62 being placed axially outside the welded portion 25 (see FIG. 8).

Figure 9:
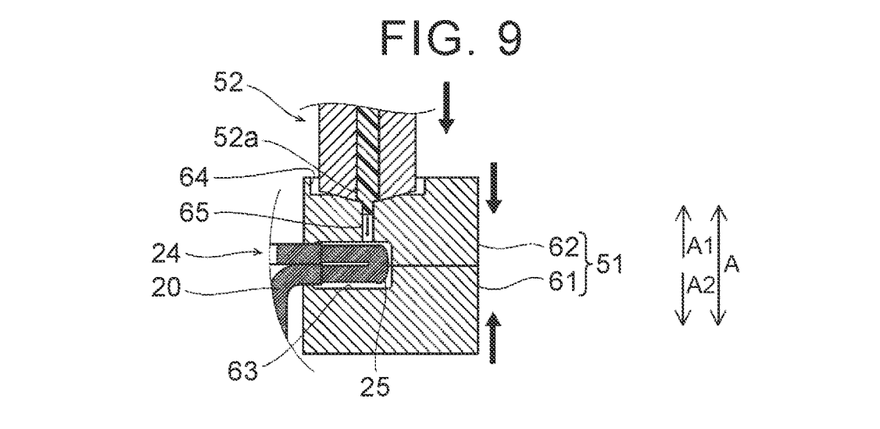
FIG. 9 is an enlarged section illustrating the step of injecting resin into the resin-molding mold by a resin injection portion.

Thereafter, as shown in FIG. 9, the first mold 61 and the second mold 62 are moved toward each other in the axial direction to close the mold. The welded portion 25 is thus accommodated in the cavity 63 of the resin-molding mold 51 and sandwiched and covered by the pair of resin-molding molds 51 (the first mold 61 and the second mold 62).

In the first embodiment, the step of sandwiching and covering the welded portion 25 of the coil wires 20 by the pair of resin-molding molds 51 is performed by covering by the resin-molding mold 51 the uncoated parts 20b of the coil wires 20 which include the welded portion 25 and the parts of the coil wires 20 which adjoin the uncoated parts 20b and which have the insulating coating 20a formed thereon (a part of the coated parts 20c). That is, the welded portion 25, the uncoated parts 20b, and a part of the coated parts 20c of the ends 24 of the lead wire portions 23 (coil wires 20) are accommodated in the cavity 63 of the resin-molding mold 51. As shown in FIGS. 8 and 9, the pair of resin-molding molds 51 (the first mold 61 and the second mold 62) cover the range of a predetermined distance from the ends 24 (welded portion 25) of the lead wire portions 23 (coil wires 20) to the coil end portions 22. The pair of resin-molding molds 51 (the first mold 61 and the second mold 62) also cover a part of the ends 24 of the lead wire portions 23 (coil wires 20) which project beyond the coil end portions 22.

<Step of Injecting Resin into the Resin-Molding Mold by the Resin Injection Portion>

As shown in FIG. 9, in the step of injecting resin, the resin injection portion 52 is moved toward the resin-molding resin 51 (in the A2 direction) so that the injection port 52a is connected to the positioning recess 64 of the second mold 62. The resin injection portion 52 ejects molten resin from the injection port 52a to inject the molten resin into the cavity 63 through the injection passage 65.

The step of injecting resin is thus performed by injecting resin into the resin-molding mold 51 in the direction that crosses (is perpendicular to) the direction in which the coil wires 20 extend (the radial direction of the stator 100). That is, the resin injection portion 52 injects resin into the resin-molding mold 51 in the axial direction (A direction) from the outside in the axial direction (A1 direction side) of the stator 10.

Figure 8:
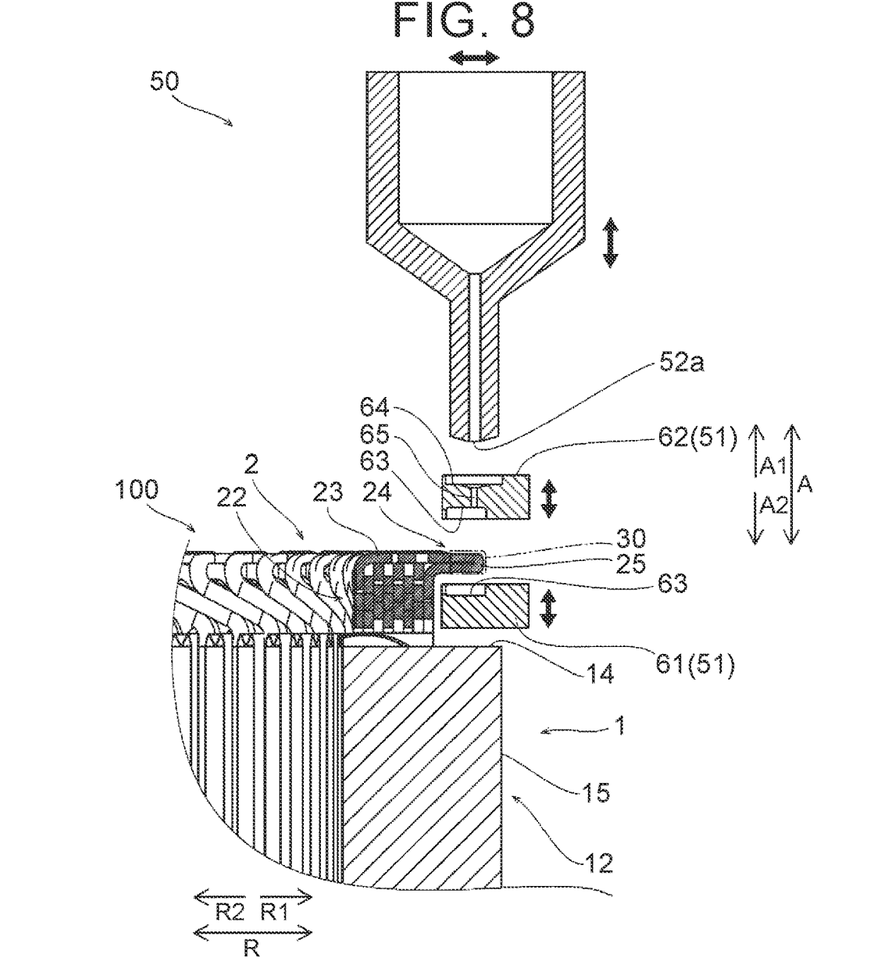
FIG. 8 is an enlarged section illustrating the step of covering a welded portion by a resin-molding mold.

After the resin is injected into the cavity 63, the resin injection portion 52 is moved away from the resin-molding mold 51 (in the A1 direction) so that the injection port 52a is separated from the positioning recess 64 of the second mold 62, as shown in FIG. 8. The first mold 61 and the second mold 62 are then moved away from each other in the axial direction to open the resin-molding mold 51. By the time the mold is opened, the resin in the cavity 63 cures to form the insulating coating portion 30. Insulation coating of a single welded portion 25 (located at one position) is thus completed.

<Step of Rotating the Stator and the Resin Injection Portion Relative to Each Other in the Circumferential Direction of the Stator>

The insulating resin coating method according to the first embodiment may further include the step of rotating the stator 100 and the resin injection portion 52 relative to each other in the circumferential direction of the stator 100. In the first embodiment, the step of rotating the stator 100 and the resin injection portion 52 relative to each other is performed by rotating the stator 100 relative to the resin injection portion 52.

That is, as shown in FIG. 7, the support portion 53 rotates the stator 100 about the central axis Ax in the circumferential direction (C direction). The support portion 53 rotationally moves the stator 100 in the circumferential direction by an amount corresponding to a single welded portion (hereinafter referred to as incrementally moves the stator 100). As a result, the insulation-coated welded portion 25 (insulating coating portion 30) is moved from between the first mold 61 and the second mold 62 which are separated from each other in the axial direction, and the subsequent welded portion 25 to be insulation-coated is slid in the circumferential direction to a mold closing position between the first mold 61 and the second mold 62.

Subsequently, the welded portion 25 thus placed between the first mold 61 and the second mold 62 is subjected to the step of covering the welded portion 25 by the resin-molding mold 51 and the step of injecting resin into the resin-molding mold 51. The insulation coating process is thus performed.

Each of the plurality of welded portions 25 is coated with an insulating resin by repeatedly performing the step of covering the welded portion 25 by the resin-molding mold 51 and the step of injecting resin while incrementally moving the stator 100 in the circumferential direction (C direction). The process is completed when the insulation coating process is repeated for all of the welded portions 25 that are to be subjected to the insulation coating process.

(Effects of First Embodiment)

The first embodiment has the following effects.

As described above, the method of the first embodiment includes the step of sandwiching and covering the welded portion 25 of the coil wires 20 by the pair of resin-molding molds 51 (the first mold 61 and the second mold 62) and the step of injecting resin into the resin-molding mold 51 by the resin injection portion 52. Each welded portion 25 can thus be insulation-coated by forming an insulating resin (insulating coating portion 30) only on a portion necessary to insulation-coat the welded portion 25 by resin molding using the resin-molding mold 51. The welded portion 25 can be coated by merely closing the resin-molding mold 51 with the welded portion 25 sandwiched in the middle and injecting resin into the resin-molding mold 51. Accordingly, unlike the case where a cap-shaped insulating resin is attached to each welded portion 25, the plurality of welded portions 25 can be insulation-coated without requiring the step of applying an adhesive. Productivity is therefore not reduced. As described above, according to the first embodiment, the insulating resin (insulating coating portion 30) can be formed only on portions necessary to insulate the welded portions 25 without reducing productivity. The amount of resin material required and the size (area) of the portion to be coated with resin can thus be reduced as compared to the case where, e.g., the entire coil end portions 22 including the welded portion 25 need be coated with an insulating resin by powder coating. The stator 100 having improved cooling efficiency for the coils 2 when in use can thus be obtained.

As described above, in the first embodiment, the step of sandwiching and covering the welded portion 25 by the pair of resin-molding molds 51 (the first mold 61 and the second mold 62) may be performed by covering the uncoated parts 20b of the coil wires 20 which include the welded portion 25, and the parts of the coil wires 20 which adjoin the uncoated parts 20b and which have the insulating coating 20a formed thereon (a part of the coated parts 20c), by the resin-molding mold 51. With this configuration, the insulating resin (insulating coating portion 30) can be formed so as to completely coat those regions of the ends 24 of the coil wires 20 from which the insulating coating 20a has been removed (the uncoated parts 20b). This can more reliably ensure insulation of the welded portions 25.

As described above, in the first embodiment, the step of rotating the stator 100 and the resin injection portion 52 relative to each other in the circumferential direction of the stator 100 may further be included. With this configuration, closing of the resin-molding mold 51 and injection of resin can be sequentially performed for one or more welded portions by rotating the stator 100 and the resin injection portion 52 relative to each other in the circumferential direction of the stator 100. As a result, the device configuration can be simplified and the insulating resin (insulating coating portion 30) can be easily formed as compared to the case where, e.g., the insulating coating portion 30 is formed on all of the welded portions 25 at a time.

As described above, in the first embodiment, each of the plurality of welded portions 25 may be coated with the insulating resin (insulating coating portion 30) by repeatedly performing the step of sandwiching and covering the welded portion 25 by the pair of resin-molding molds 51 (the first mold 61 and the second mold 62) and the step of injecting resin. With this configuration, the plurality of welded portions 25 can be sequentially insulation-coated easily and quickly by merely repeatedly performing the step of covering the welded portion 25 by the resin-molding mold 51 and the step of injecting resin while shifting the welded positions 25 by the step of rotating the stator 100 and the resin injection portion 52 relative to each other in the circumferential direction of the stator 100.

As described above, in the first embodiment, the step of rotating the stator 100 and the resin injection portion 52 relative to each other may be performed by rotating the stator 100 relative to the resin injection portion 52. With this configuration, the resin-molding mold 51 and the resin injection portion 52 need not be moved in the circumferential direction (C direction) of the stator 100, whereby the device configuration of the coating device 50 that is used for the insulation coating process can be simplified.

As described above, in the first embodiment, the step of injecting resin may be performed by injecting resin into the resin-molding mold 51 in the direction crossing the direction in which the coil wires 20 extend (the radial direction). With this configuration, the surface of the ends 24 of the coil wires 20 which faces the direction crossing the direction in which the coil wires 20 extend can be reliably coated with resin. Of the outer peripheral surfaces of the ends 24 of the coil wires 20 including the welded portion 25, the outer (axially outer) surface on which an external device etc. is to be placed can be more reliably insulation-coated.

As described above, in the first embodiment, the direction in which the coil wires 20 extend may be the radial direction (R direction) of the stator 100 and the resin injection portion 52 may inject resin into the resin-molding mold 51 in the axial direction from the outside in the axial direction (A direction) of the stator 100. With this configuration, since resin is injected in the axial direction, the installation area of the coating device 50 on a plane in the radial direction of the stator 100 can be reduced. Moreover, the direction in which the stator 100 is rotated relative to the resin injection portion 52 (the circumferential direction) can be made different from the direction in which the resin injection portion 52 is operated to inject resin (the axial direction). The insulation coating process for the plurality of welded portions 25 can be efficiently performed by merely rotating the stator 100 in the circumferential direction while withdrawing the resin-molding mold 51 and the resin injection portion 52 in the axial direction.

As described above, in the first embodiment, the welded portions 25 may be formed so as to extend in the radial direction of the stator core 1 and the plurality of insulating coating portions 30 may be located at intervals in the circumferential direction of the stator core 1. With this configuration, the insulating coating portions 30 for the individual welded portions 25 can be individually formed on necessary portions. Accordingly, insulation can be more effectively ensured. In the case where the welded portions 25 extend in a radial pattern in the radial direction, the circumferential intervals between the welded portions 25 are large. In this case, if all of the plurality of welded portions 25 are coated with a single insulating coating portion 30, a larger amount of resin material is required because an insulating resin need also be formed in the circumferential spaces between the welded portions 25. However, since the insulating coating portions 30 are formed at intervals in the circumferential direction, the required amount of resin material can be reduced.

As described above, in the first embodiment, the insulating coating portion 30 may be formed so as to fill at least a part of the space (clearance S) between the facing surfaces 20d of the ends 24 of the pair of coil wires 20 connected by the welded portion 25. With this configuration, the insulating resin (inner coating portion 30a) formed in the clearance S between the facing surfaces 20d can function as a retainer that engages with the welded portion 25. The insulating coating portion 30 can thus be stably prevented from coming off.

In the case where the stator 100 is subjected to vibration such as in the case where the stator 100 is mounted on a vehicle such as an automobile, the pair of coil wires 20 welded together may be subjected to an external force in the direction in which the pair of coil wires 20 are separated from each other along a contact portion 26 therebetween (see FIG. 6). If the coil wires 20 are separated from each other along the contact portion 26, there is a risk that the facing surfaces 20d may be exposed to the outside in the clearance S. However, since the facing surfaces 20d are covered with the insulating resin (inner coating portion 30a) formed in the clearance S, it is ensured that the facing surfaces 20d (uncoated parts 20b) are insulated from iron powder etc. that are present around the facing surfaces 20d (uncoated parts 20b) and on external peripheral members, even if the coil wires 20 are separated from each other along the contact portion 26 due to external factors.

Second Embodiment

A second embodiment of the present disclosure will be described with reference to FIG. 10. Unlike the first embodiment showing an example in which the insulating coating portion 30 is formed on each welded portion 25 by a single resin injection portion 52, the second embodiment will be described with respect to an example in which formation of insulating coating portions 30 is performed in parallel by a plurality of resin injection portions 52. Since the configuration of a stator 100 of the second embodiment is similar to the first embodiment, description thereof will be omitted.

In an insulating resin coating method according to the second embodiment, the step of injecting resin is performed in parallel for each of a plurality of resin-molding molds 51 by a plurality of resin injection portions 52 arranged in the circumferential direction (C direction) of the stator 100.

Figure 10:
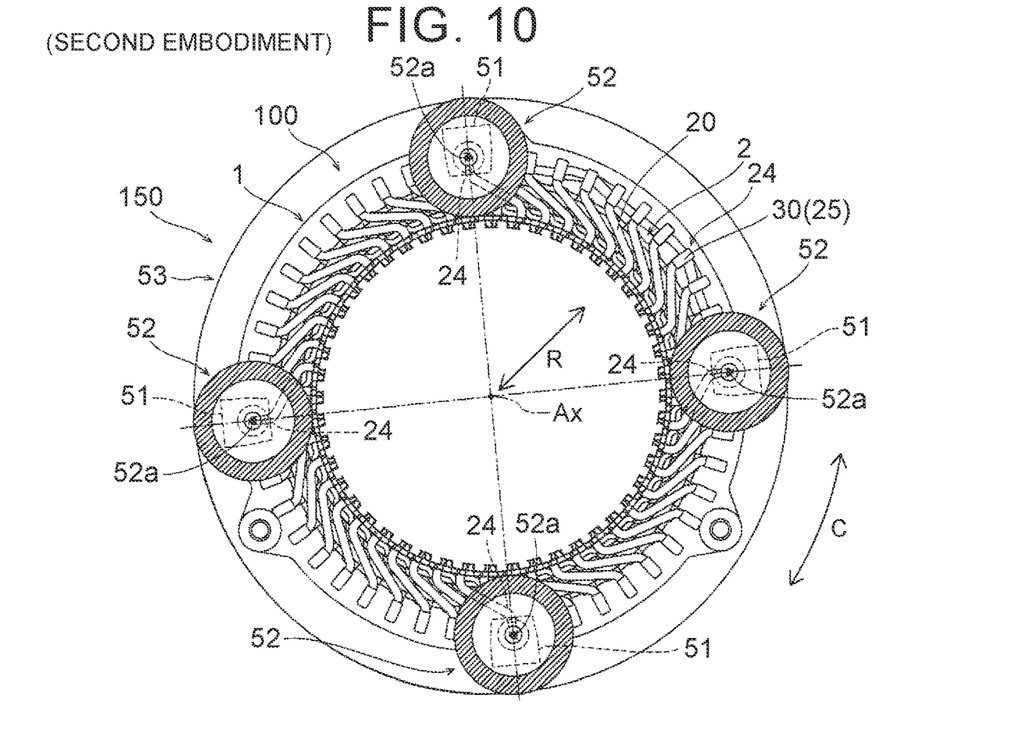
FIG. 10 is a plan view illustrating an insulating resin coating method according to a second embodiment.

Specifically, as shown in FIG. 10, a coating device 150 includes a plurality of resin injection portions 52 and resin-molding molds 51 arranged in the circumferential direction (C direction) of the stator 100.

FIG. 10 shows an example in which the coating device 150 includes four sets of resin injection portion 52 and resin-molding mold 51. The coating device 150 may include a plurality of sets of resin injection portion 52 and resin-molding mold 51 other than four sets, and the number of resin injection portions 52 and resin-molding molds 51 can be determined within the range in which the resin injection portions 52 do not interfere with each other. Since the step of injecting resin is performed in parallel by the resin injection portions 52, it is preferable in terms of efficiency that the number of resin injection portions 52 be a number that can divide the number of welded portions 25 to be insulation-coated without remainder. For example, in the case where four resin injection portions 52 are provided for a total of 96 welded portions 25, the step of injecting resin need only be repeated 24 times. However, if the number of welded portions 25 is indivisible by the number of resin injection portions 52 and there is a remainder of the welded portions 25, the step of injecting resin need be performed the number of times equal to the quotient plus one.

It is preferable that the plurality of resin injection portions 52 be arranged at regular angular intervals in the circumferential direction (C direction) of the stator 100. This allows the same number of welded portions 25 to be assigned to each of the resin injection portions 52 when the stator 100 is incrementally moved in the circumferential direction such that each welded portion 25 is shifted by one.

The structures of the resin injection portion 52 and the resin-molding mold 51 are similar to the first embodiment. The configuration of the second embodiment is otherwise similar to the first embodiment.

(Effects of Second Embodiment)

In the second embodiment, as in the first embodiment, each welded portion 25 can be insulation-coated by forming an insulating resin (insulating coating portion 30) only on a portion necessary to insulation-coat the welded portion 25, and the plurality of welded portions 25 can be insulation-coated by resin molding without requiring the step of applying an adhesive. An insulating resin (insulating coating portion 30) can thus be formed only on portions necessary to insulate the welded portions 25 without reducing productivity.

As described above, in the second embodiment, the step of injecting resin may be performed in parallel for each of the plurality of resin-molding molds 51 by the plurality of resin injection portions 52 arranged in the circumferential direction of the stator 100. With this configuration, the insulation coating process can be performed for the plurality of welded portions 25 at a time. The insulation coating process can thus be efficiently performed without reducing productivity, even when the individual welded portions 25 are insulation-coated.

In particular, since the direction in which the coil wires 20 extend is the radial direction (R direction) of the stator 100 and the resin injection portions 52 inject resin into the resin-molding molds 51 in the axial direction from the outside in the axial direction (A direction) of the stator 100, all of the plurality of welded portions 25 can be located at the mold closing positions of the resin-molding molds 51 by merely rotationally moving the stator 100 in the circumferential direction. Since the plurality of resin-molding molds 51 and resin injection portions 52 need not be moved in the circumferential direction, the insulation coating process can be more efficiently performed.

Other effects of the second embodiment are similar to the first embodiment.

Third Embodiment

A third embodiment of the present disclosure will be described with reference to FIG. 11. Unlike the first embodiment showing an example in which the insulation coating process is performed for the stator 100 having the welded portions 25 formed in advance (having been subjected to a welding process), the third embodiment will be described with respect to an example in which formation of a welded portion 25 (welding process) and formation of an insulating coating portion 30 (insulation coating process) are performed in parallel. Since the configuration of a stator 100 according to the third embodiment is similar to the first embodiment, description thereof will be omitted.

An insulating resin coating method according to the third embodiment includes the step of forming a welded portion 25 by welding ends of coil wires 20 with a welding torch 211 positioned at a position different from a resin injection portion 52 in the circumferential direction of the stator 100, and the step of forming the welded portion 25 is performed in parallel with the step of injecting resin.

Figure 11:
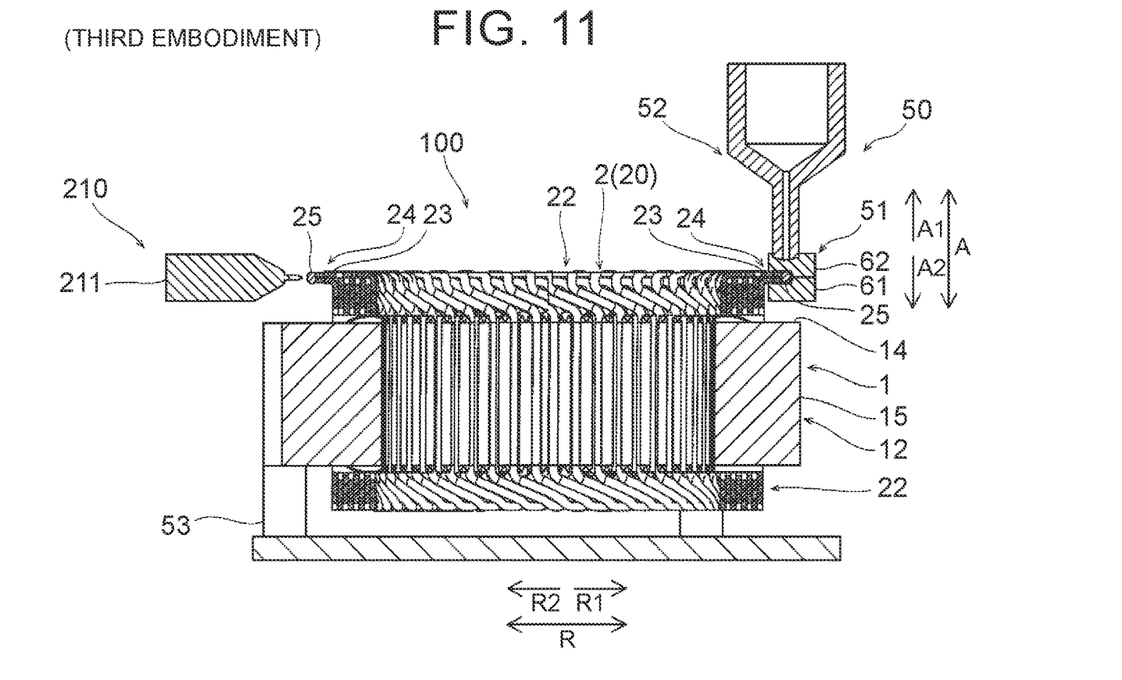
FIG. 11 is a sectional view illustrating an insulating resin coating method according to a third embodiment.

Specifically, as shown in FIG. 11, a welding device 210 is disposed in addition to a coating device 50. The welding device 210 includes the welding torch 211. Since a known configuration can be used for the welding device 210, description thereof will be omitted.

For example, the welding device 210 is placed at a position on the opposite side (the position shifted by 180 degrees) from the resin injection portion 52 and the resin-molding mold 51 in the circumferential direction (C direction). With ends 24 of a pair of coil wires 20 to be welded together being held with a clamp mechanism, not shown, the welding device 210 welds the ends with the welding torch 211. The welded portion 25 is formed in this manner.

In the third embodiment, the stator 100 having not been subjected to the welding process (having no welded portion 25 formed therein) is placed on a support portion 53. As shown in FIG. 11, in the case where the welding torch 211 and the resin injection portion 52 are arranged at positions shifted by 180 degrees from each other, the welding process using the welding torch 211 is first started. After the stator 100 makes half a rotation, the insulation coating process with the resin injection portion 52 and the resin-molding mold 51 is started. After the stator 100 makes half a rotation, formation of the welded portion 25 with the welding torch 211 and insulation coating of the welded portion 25 with the resin injection portion 52 and the resin-molding mold 51 are performed in parallel.

As in the second embodiment, a plurality of the welding torches 211 and a plurality of resin injection portions 52 and resin-molding molds 51 may be arranged in the circumferential direction (C direction). In this case, the number of welding torches 211 may be the same as the number of resin injection portions 52 and the number of resin-molding molds 51, and the welding torches 211 and the resin injection portions 52 and the resin-molding molds 51 may be alternately arranged in the circumferential direction. This arrangement makes a plurality of pairs of welding torch 211 and resin injection portion 52. Accordingly, after the welded portions 25 are formed with the welding torches 211, the welded portions 25 can be simultaneously insulation-coated at a plurality of positions with the pairs of resin injection portion 52 and resin-molding mold 51 as the stator 100 is rotated in the circumferential direction.

The configuration of the third embodiment is otherwise the same as the first embodiment.

(Effects of Third Embodiment)

In the third embodiment, as in the first embodiment, each welded portion 25 can be insulation-coated by forming an insulating resin (insulating coating portion 30) only on a portion necessary to insulation-coat the welded portion 25, and the plurality of welded portions 25 can be insulation-coated by resin molding without requiring the step of applying an adhesive. An insulating resin (insulating coating portion 30) can thus be formed only on portions necessary to insulate the welded portions 25 without reducing productivity.

As described above, in the third embodiment, the insulating resin coating method may include the step of forming the welded portion 25 by welding the ends 24 of the coil wires 20 with the welding torch 211 positioned at a position different from the resin injection portion 52 in the circumferential direction (C direction) of the stator 100, and the step of forming the welded portion 25 may be performed in parallel with the step of injecting resin. With this configuration, the step of injecting resin (insulation coating process) and the welding step can be performed at the same time without transferring the stator 100 to individual facilities. This can achieve reduction in size of a production facility for the stator 100 and improvement in productivity.

Other effects of the third embodiment are similar to the first embodiment.

Fourth Embodiment

A fourth embodiment of the present disclosure will be described with reference to FIGS. 8 and 12. Unlike the first embodiment showing an example in which the insulation coating process is performed with the plurality of welded portions 25 being individually covered by the resin-molding mold 51, the fourth embodiment will be described with respect to an example in which an insulation coating process is performed with a plurality of welded portions 25 being covered by a common resin-molding mold 351. Since the configuration of a stator 100 according to the fourth embodiment is similar to the first embodiment, description thereof will be omitted.

Figure 12:
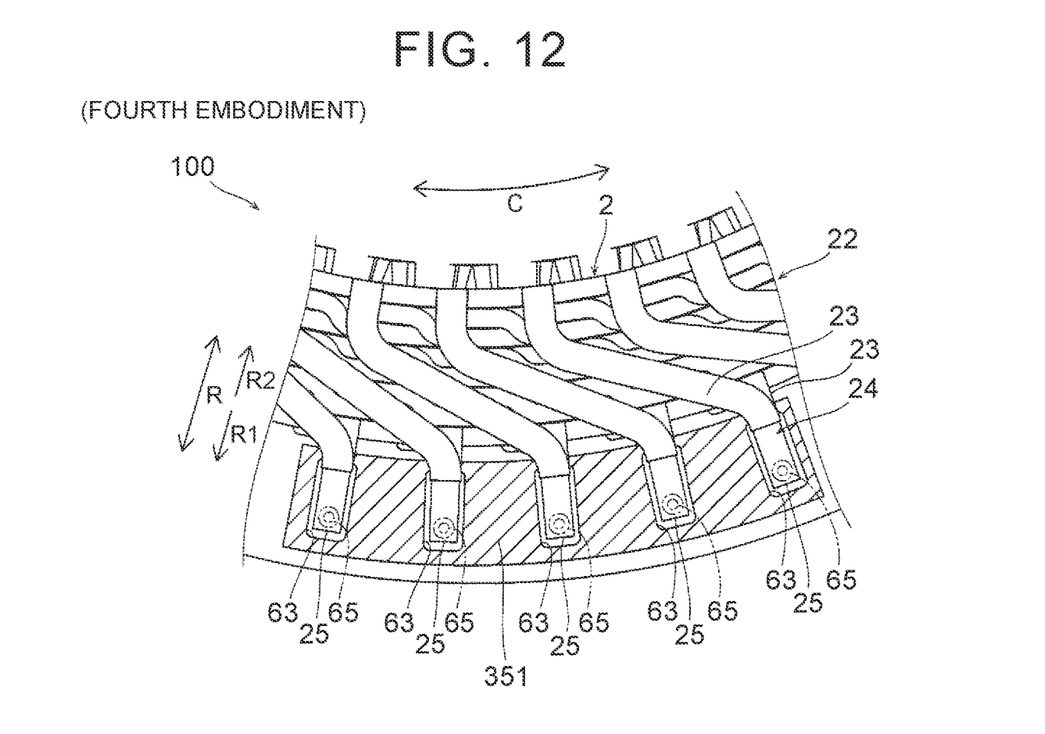
FIG. 12 is a schematic view illustrating an insulating resin coating method according to a fourth embodiment.

As shown in FIG. 12, in an insulating resin coating method according to the fourth embodiment, the step of sandwiching and covering a welded portion by a pair of resin-molding molds is performed by covering a plurality of welded portions 25 by a common resin-molding mold 351. In the fourth embodiment as well, the resin-molding mold 351 is formed by a first mold and a second mold, and description of the first mold and the second mold will be omitted. The shape of the welded portions 35 is shown simplified in FIG. 12 for convenience.

In the fourth embodiment, the resin-molding mold 351 can cover a plurality of welded portions 25 at a time. FIG. 12 shows an example in which the resin-molding mold 351 has five cavities 63 so that the resin-molding mold 351 can cover five welded portions 25. The resin-molding mold 351 further has five injection passages 65 communicating with the five cavities 63. The resin-molding mold 351 may be configured to cover a plurality of welded portions 25 more or less than five welded portions.

In the fourth embodiment, five resin injection portions 52 (see FIG. 8) may be provided so as to correspond to the five injection passages 65 (cavities 63), or the number of resin injection portions 52 may be smaller than the number of injection passages 65. For example, in the case where only one resin injection portion 52 is provided, the resin injection portion 52 is configured so that the resin injection portion 52 can move with respect to the resin-molding mold 351. In this case, injection of resin can be performed at the positions of the five injection passages 65 by moving the resin injection portion 52 in the circumferential direction (C direction). Alternatively, the resin-molding mold 351 may be configured so that the resin-molding mold 351 together with the stator 100 is incrementally moved in the circumferential direction to position each injection passage 65 at the injection position of the resin injection portion 52.

The resin-molding mold 351 may have a single injection passage 65 branched to be connected to each cavity 63. In this case, as in the first embodiment, resin can be injected into all the cavities 63 at a time by a single resin injection portion 52.

The configuration of the fourth embodiment is otherwise similar to the first embodiment.

(Effects of Fourth Embodiment)

In the fourth embodiment, as in the first embodiment, each welded portion 25 can be insulation-coated by forming an insulating resin (insulating coating portion 30) only on a portion necessary to insulation-coat the welded portion 25, and the plurality of welded portions 25 can be insulation-coated by resin molding without requiring the step of applying an adhesive. An insulating resin (insulating coating portion 30) can thus be formed only on portions necessary to insulate the welded portions 25 without reducing productivity.

In the fourth embodiment, as described above, the step of sandwiching and covering the welded portion by the pair of resin-molding molds may be performed by covering a plurality of welded portions 25 by the common resin-molding mold 351. With this configuration, a mold closing operation and a mold opening operation can be performed for a plurality of welded portions 25 at a time. The number of times the mold closing operation and the mold opening operation are performed can thus be reduced as compared to the case where the mold closing operation and the mold opening operation are performed for the individual welded portions 25 one by one. Productivity can therefore be improved.

Other effects of the fourth embodiment are similar to the first embodiment.

For example, the first to fourth embodiments are described with respect to an example in which the stator 100 is rotated in the circumferential direction in the step of rotating the stator 100 and the resin injection portion 52 relative to each other in the circumferential direction (C direction) of the stator 100. However, the present disclosure is not limited to this. In the present disclosure, the resin injection portion 52 (and the resin-molding molds 51, 351) may be rotated (turned) in the circumferential direction, or both the stator 100 and the resin injection portion 52 (and the resin-molding mold 51, 351) may be rotationally moved in the circumferential direction.

Figure 13:
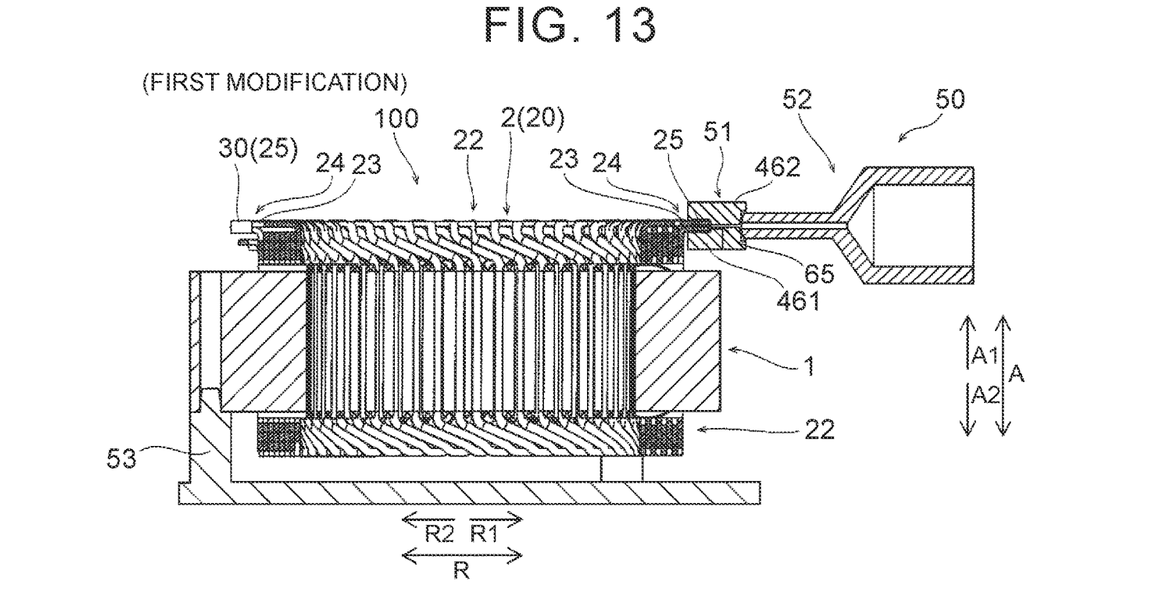
FIG. 13 is a sectional view illustrating a first modification regarding the step of injecting resin into the resin-molding mold.

The first to fourth embodiments are described with respect to an example in which the resin injection portion 52 injects resin into the resin-molding mold 51 (351) in the axial direction (A direction) crossing the direction in which the coil wires 20 extend (the radial direction). However, the present disclosure is not limited to this. In the present disclosure, as in a first modification shown in FIG. 13, the resin injection portion 52 may inject resin in the direction parallel to the direction in which the coil wires 20 extend (the radial direction). In this case, the resin-molding mold 51 includes a first mold 461 and a second mold 462 according to the direction in which resin is injected. The second mold 462 has an injection passage 65 extending in the radial direction to a radial (R direction) outer end.

Figure 14:
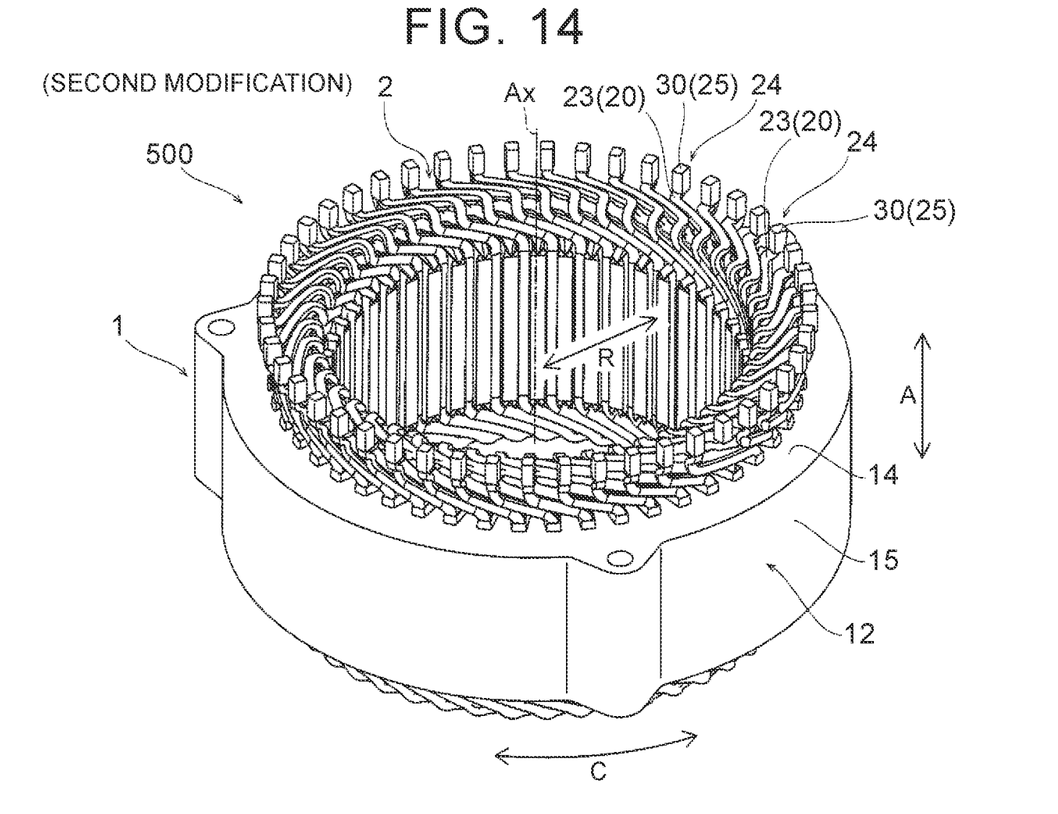
FIG. 14 is a perspective view of a stator illustrating a second modification regarding the direction in which coil wires extend.

The first to fourth embodiments are described with respect to an example in which the ends 24 of the coil wires 20 (lead wire portions 23) are formed to extend in the radial direction (R direction) of the stator core 1. However, the present disclosure is not limited to this. As shown in a second modification of FIG. 14, the present disclosure may be applied to a stator 500 in which the ends 24 of the coil wires 20 (lead wire portions 23) are formed to extend in the axial direction (A direction) of the stator core 1. In the stator 500, the end 24 of each coil wire 20 (lead wire portion 23) is bent to extend axially outward.

The fourth embodiment is described with respect to an example in which an insulating coating process is performed by using the resin-molding mold 351 having five cavities 63, namely the same number of cavities 63 as the number of (five) welded portions 25 to be insulation-coated at a time. However, the present disclosure is not limited to this. In the present disclosure, as shown in a third modification of FIG. 15, the number of cavities may be smaller than the number of welded portions 25.

Figure 15:
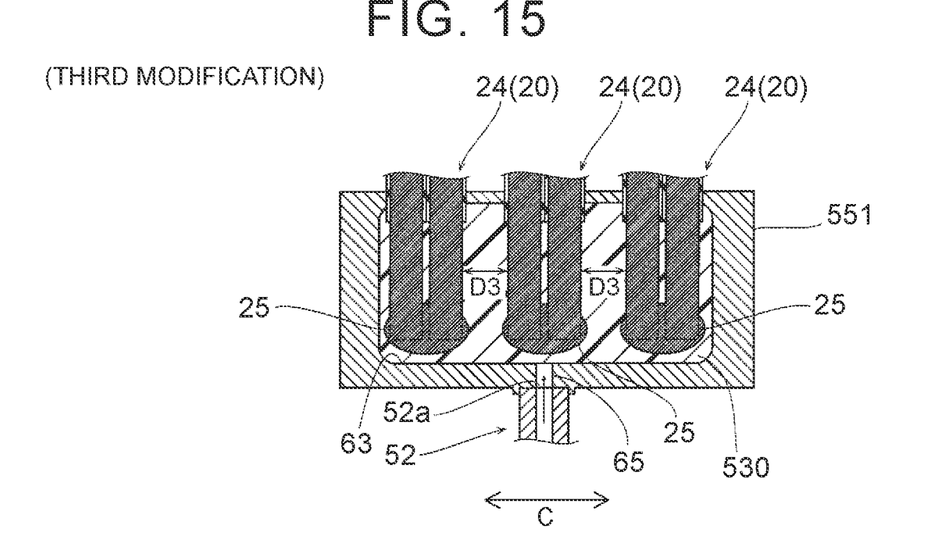
FIG. 15 is a schematic sectional view illustrating a third modification regarding the resin-molding mold.

A resin-molding mold 551 shown in FIG. 15 has a single cavity 63 for three welded portions 25. The three welded portions 25 are insulation-coated at a time in the cavity 63 by injection of resin through an injection passage 65. An insulating coating portion 530 in the example of FIG. 15 has the shape of a wide plate so as to cover three welded portions 25. A plurality of welded portions 25 more or less than three may be insulation-coated at a time. The resin-molding mold 551 may have one or more cavities 63.

Alternatively, all of the welded portions 25 (along the entire circumference) of the stator 100 may be subjected to resin molding at a time with a resin-molding mold. In this case, the step of rotating the stator 100 and the resin injection portion 52 relative to each other in the circumferential direction (C direction) of the stator 100 is not required.

The configuration in which a plurality of welded portions 25 are insulation-coated at a time as described above is effective in the case where it is difficult to individually place a resin-molding mold due to a small interval D3 between the ends 24 of adjacent ones of the coil wires 20. By arranging the ends 24 in groups of one or more (three) so that each group is insulation-coated at a time as shown in FIG. 15, an interval for placing a resin-molding mold can be reliably provided between the groups.

The fourth embodiment is described with respect to an example in which the injection passages 65 are placed on the upper surfaces of the cavities 63 when a plurality of welded portions 25 are covered by the common resin-molding mold 351 to perform the insulating coating process. However, the present disclosure is not limited to this. As in a fourth modification shown in FIG. 16, a resin-molding mold 651 may have a runner (connection passage) 666 connecting adjacent cavities 663, and an injection passage 665 may be connected to the runner 666. In this case, it is preferable that the runner 666 be located at a position inside (axially or radially inside) the outer (axially or radially outer) inner wall surfaces of the cavities 663.

Figure 16:
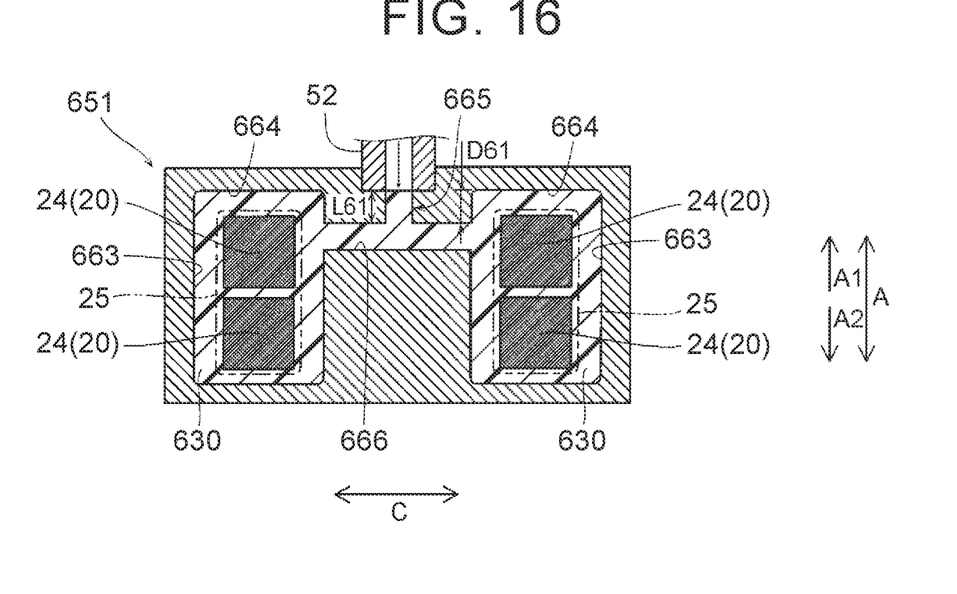
FIG. 16 is a schematic sectional view illustrating a fourth modification regarding the resin-molding mold.

FIG. 16 shows an example in which the injection passage 665 extends in the axial direction (A direction) (see FIG. 8). The runner 666 is located at a position axially inside (on the A2 direction side of) axially outer (A1 direction side) upper surfaces 664 of the cavities 663. That is, the runner 666 is located at a position lower than the upper surfaces 664 of the cavities 663 in the axial direction. It is preferable that an axial distance D61 between the runner 666 and the upper surface 664 of each cavity 663 be equal to or greater than a length L61 of the injection passage 665.

Figure 17:
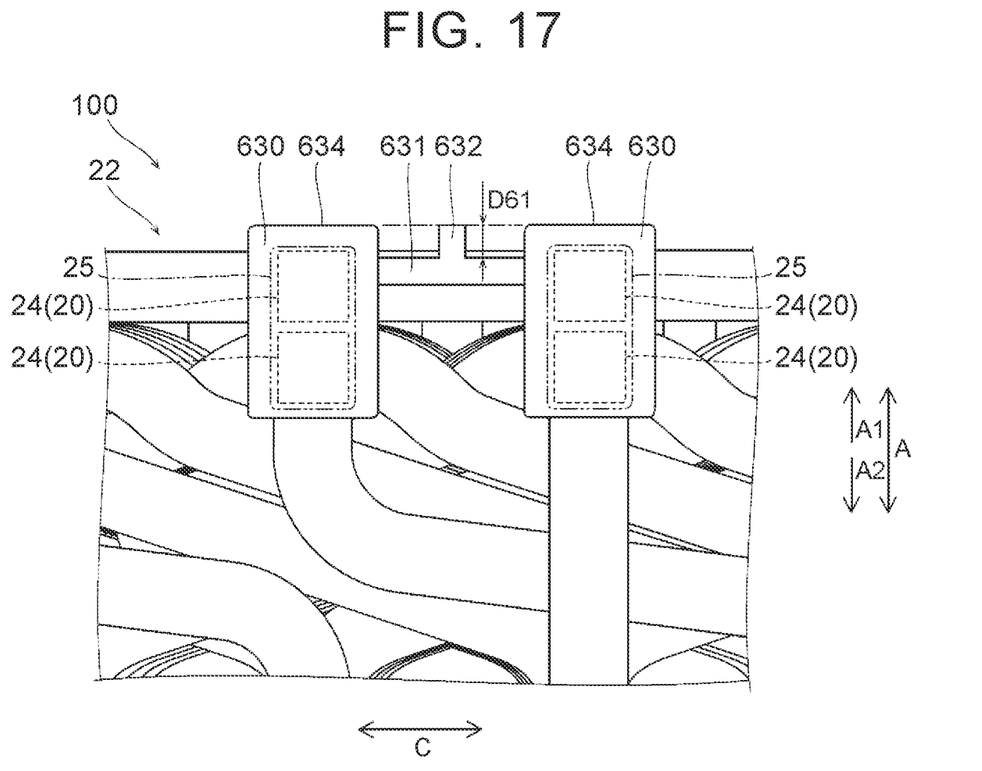
FIG. 17 is a view showing insulating coating portions formed by the resin-molding mold of the fourth modification.

In the configuration like the fourth modification, as shown in FIG. 17, adjacent insulating coating portions 630 are connected by a bridge portion 631 made of resin injected into the runner 666. The bridge portion 631 has an injection mark 632 corresponding to the injection passage 665 and facing outward in the axial direction (A1 direction). FIG. 17 is a side view of the coil end portions 22 of the stator 100 as viewed in the radial direction from the outside in the radial direction (R direction). The A1 direction is toward the outside in the axial direction of the stator 100, and the A2 direction is toward the inside in the axial direction (the stator core 1 side) of the stator 100. This configuration prevents the injection mark 632 from projecting axially outward beyond axial upper surfaces 634 of the insulating coating portions 630. This restrains the stator 100 from having an increased axial dimension due to the injection mark 632. Similarly, in the case where the injection passage 665 extends in the radial direction (R direction), placing the runner 666 radially inside the radially outer inner wall surfaces of the cavities 663 restrains the stator 100 from having an increased radial dimension due to the injection mark 632.

The invention claimed is:

1. An insulating resin coating method for coating with an insulating resin a weld of a stator having a plurality of the welds formed by welding ends of coil wires together, the method comprising the steps of:
   sandwiching and covering the weld of the coil wires by a pair of resin-molding molds; and
   injecting the resin into the resin-molding molds by a resin injector.

2. The insulating resin coating method according to claim 1, wherein
   the weld is formed on uncoated parts of the coil wires, the uncoated parts of the coil wires being parts from which an insulating coating has been removed, and
   the step of sandwiching and covering the weld of the coil wires by the pair of resin-molding molds is performed by covering by the resin-molding molds the uncoated parts of the coil wires which include the weld and parts of the coil wires which adjoin the uncoated parts and on which the insulating coating is formed.

3. The insulating resin coating method according to claim 2, further comprising the step of:
   rotating the stator and the resin injector relative to each other in a circumferential direction of the stator.

4. The insulating resin coating method according to claim 3, wherein
   each of the plurality of welds is coated with the insulating resin by repeatedly performing the step of sandwiching and covering the weld by the pair of resin-molding molds and the step of injecting the resin.

5. The insulating resin coating method according to claim 4, wherein
   the step of rotating the stator and the resin injector relative to each other is performed by rotating the stator relative to the resin injector.

6. The insulating resin coating method according to claim 5, wherein
   the step of injecting the resin is performed in parallel for a plurality of the resin-molding molds by a plurality of the resin injectors arranged in the circumferential direction of the stator.

7. The insulating resin coating method according to claim 6, wherein
   the step of injecting the resin is performed by injecting the resin into the resin-molding molds in a direction crossing a direction in which the coil wires extend.

8. The insulating resin coating method according to claim 7, wherein
   the direction in which the coil wires extend is a radial direction of the stator, and
   the resin injector injects the resin into the resin-molding molds in an axial direction of the stator from outside in the axial direction of the stator.

9. The insulating resin coating method according to claim 8, wherein
   the step of sandwiching and covering the weld by the pair of resin-molding molds is performed by covering a plurality of the welds by a common resin-molding mold.

10. The insulating resin coating method according to claim 9, further comprising the step of:
    forming the weld by welding the ends of the coil wires with a welding torch positioned at a position different from the resin injector in the circumferential direction of the stator, the step of forming the weld being performed in parallel with the step of injecting the resin.

11. The insulating resin coating method according to claim 1, further comprising the step of:
    rotating the stator and the resin injector relative to each other in a circumferential direction of the stator.

12. The insulating resin coating method according to claim 1, wherein
    the step of injecting the resin is performed in parallel for a plurality of the resin-molding molds by a plurality of the resin injectors arranged in the circumferential direction of the stator.

13. The insulating resin coating method according to claim 1, wherein
    the step of injecting the resin is performed by injecting the resin into the resin-molding molds in a direction crossing a direction in which the coil wires extend.

14. The insulating resin coating method according to claim 1, wherein
    the step of sandwiching and covering the weld by the pair of resin-molding molds is performed by covering a plurality of the welds by a common resin-molding mold.

* * * * *